United States Patent Office.

W. J. WALKER, OF BROOKLYN, NEW YORK.

*Letters Patent No. 77,685, dated May 5, 1868.*

IMPROVED ACID POWDER AS A SUBSTITUTE FOR YEAST.

The Schedule referred to in these Letters Patent and making part of the same.

TO ALL WHOM IT MAY CONCERN:

Be it known that I, W. J. WALKER, of Brooklyn, county of Kings, and State of New York, have invented a certain new and useful Acid Powder, which can advantageously be used as a substitute for yeast, and one which answers admirably as a self-raising agent for flour, meal, &c., in the making of bread, pastry, and, indeed, for all uses to which yeast is applied.

To enable others skilled in the art to make and use my invention, I will proceed to describe the ingredients used, as well as the method I adopt of preparing the powder for market.

The nature of my invention consists in mixing, with a dry farinaceous substance, a certain quantity of hydrochloric (commercial muriatic) acid, in such proportions as to form a powder that furnishes a substitute for yeast.

This powder I usually prepare in the following manner: I take three (3) pounds of commercial muriatic acid, and increase, by the addition of water, &c., weight, say to six pounds. To this I add fourteen pounds of any suitable dry farinaceous substance.

In order that the powder may be fully and properly prepared, it is indispensably necessary that the farinaceous substance should be perfectly dry; and for this reason, when such farinaceous substances as flour or meal are used, which are known to contain a certain degree of moisture, it is necessary that the same should be mixed with starch or other like substance, until the same is rendered perfectly dry.

The farinaceous substance and acid thus prepared are thoroughly mixed in the following manner:

The dry farinaceous substance is placed in a suitable vessel, and the diluted muriatic acid is poured on, the whole mass is then thoroughly stirred, and swept or sifted to a powder, when it is immediately ready for use.

I have laid down as a formula, the proportions which I have proven, by experiment, act successfully, but of course they can be slightly varied without interfering in the least degree with the entirety of my invention.

This powder is used in about the following proportions: To one pound of flour, I add one teaspoonful of bicarbonate of soda, then add one ounce of my prepared powder.

After the farinaceous substance and the acid have been thoroughly mixed, and the powder formed, should greater strength in less bulk be deemed desirable, I mix a small quantity of argal, cream of tartar, or other like acid, the quantity to be mixed depending entirely on the strength desired, and the degree to which I desire to reduce the bulk of the mass of powder.

Having thus fully described my invention, and the method of using the same, what I claim as new therein, and desire to secure by Letters Patent, is—

1. Producing a powder, which is an admirable substitute for yeast, by combining with a dry farinaceous substance, a certain quantity of hydrochloric (commercial muriatic) acid, when the same is prepared substantially as described and for the purpose specified.

2. Mixing with a powder, composed of a dry farinaceous substance and muriatic acid, a certain quantity of argal, cream of tartar, or other like acid powder, substantially as is described and for the purpose specified.

3. The mixing the powder with an alkaline carbonate, in such proportions, with flour or meal, as to make a self-raising flour or meal, for the purpose of bread, pastry, &c., substantially as described.

In testimony whereof, I have signed my name to this specification in the presence of two subscribing witnesses.

W. J. WALKER.

Witnesses:
 EDWIN JAMES,
 JOHN D. BLOOR.